(12) United States Patent
Crompton et al.

(10) Patent No.: US 10,291,009 B2
(45) Date of Patent: *May 14, 2019

(54) INTEGRATED PIPING CONDUIT WITH ADAPTOR DEVICE AND METHOD

(71) Applicant: Quick Fitting, Inc., Warwick, RI (US)

(72) Inventors: David B. Crompton, Stonington, CT (US); Libardo Ochoa Dias, West Warwick, RI (US); Herbert J. Bouchard, West Greenwich, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/917,099

(22) Filed: Mar. 9, 2018

(65) Prior Publication Data

US 2018/0198270 A1    Jul. 12, 2018

Related U.S. Application Data

(63) Continuation of application No. 14/994,527, filed on Jan. 13, 2016, now Pat. No. 9,923,354, which is a continuation-in-part of application No. 14/806,828, filed on Jul. 23, 2015, now Pat. No. 9,819,165.

(60) Provisional application No. 62/029,012, filed on Jul. 25, 2014.

(51) Int. Cl.
| | | |
|---|---|---|
| *H02G 15/013* | (2006.01) | |
| *F16L 37/10* | (2006.01) | |
| *H02G 3/06* | (2006.01) | |
| *H02G 3/08* | (2006.01) | |
| *F16L 37/091* | (2006.01) | |

(52) U.S. Cl.
CPC ........ *H02G 15/013* (2013.01); *F16L 37/0915* (2016.05); *F16L 37/105* (2013.01); *H02G 3/0625* (2013.01); *H02G 3/088* (2013.01)

(58) Field of Classification Search
CPC .... H02G 15/013; H02G 3/0625; H02G 3/088; F16L 37/0915; F16L 37/105
USPC ............................ 285/39, 340, 149.1–154.4
See application file for complete search history.

(56) References Cited

U.S. PATENT DOCUMENTS

| | | | | |
|---|---|---|---|---|
| 3,647,934 A | * | 3/1972 | Hurtt .................... | H02G 3/0616 174/652 |
| 4,692,562 A | * | 9/1987 | Nattel .................. | H02G 15/013 174/653 |
| 7,390,027 B2 | * | 6/2008 | Kiely .................... | F16L 19/061 174/652 |
| 9,923,354 B2 | * | 3/2018 | Crompton ............ | H02G 15/013 |
| 2012/0098250 A1 | * | 4/2012 | Chang ................. | F16L 37/0915 285/18 |

* cited by examiner

*Primary Examiner* — James M Hewitt, II
(74) *Attorney, Agent, or Firm* — Williams Mullen; Thomas F. Bergert

(57) ABSTRACT

Embodiments of an integrated piping conduit in accordance with aspects of the present invention include a push-to-connect fitting integrated with an adaptor device and associated methods. Embodiments include an adaptor having a body portion, and an ear member extending at least partially radially outwardly and at least partially axially outwardly from the outer surface of the body portion.

4 Claims, 16 Drawing Sheets

Fig. 3
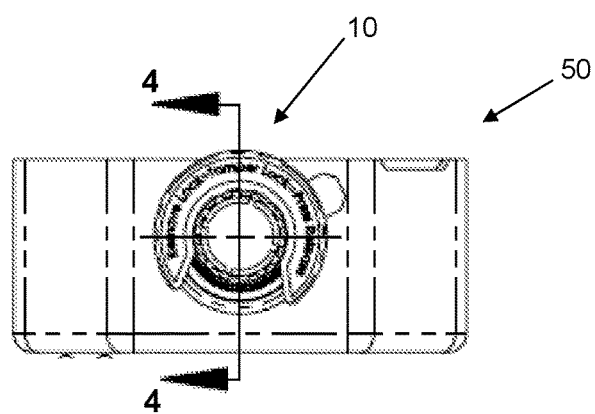
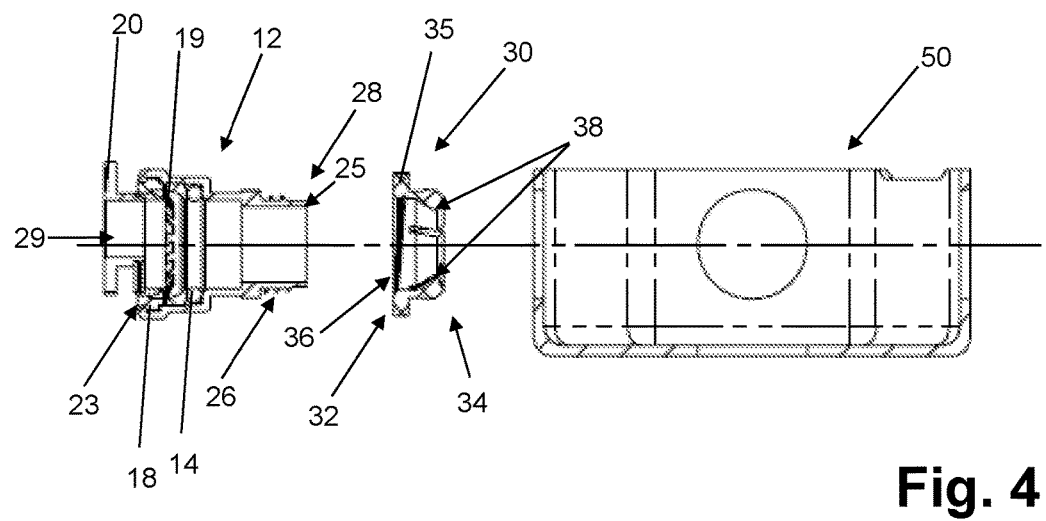
Fig. 4

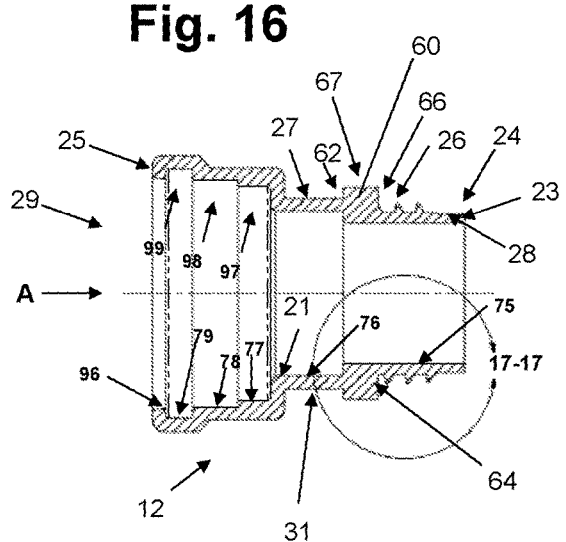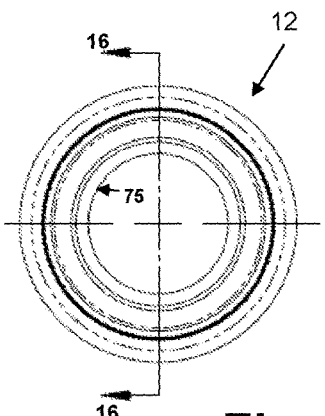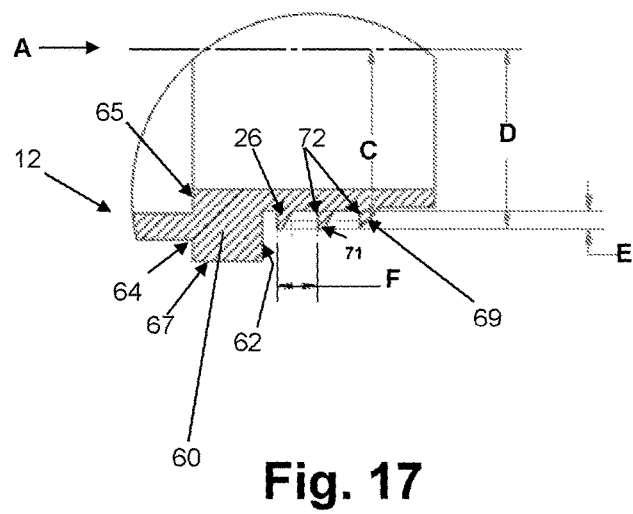

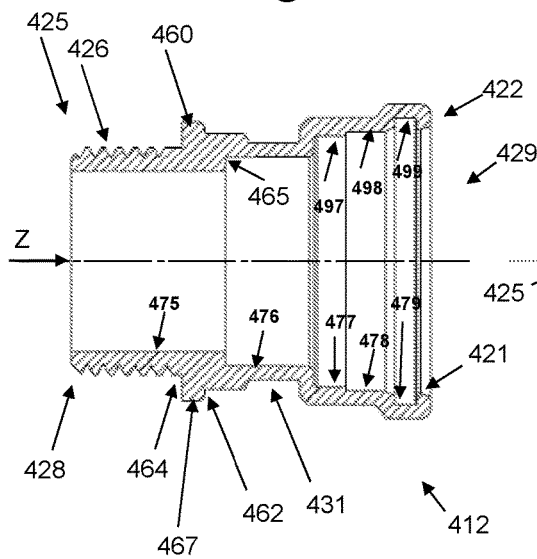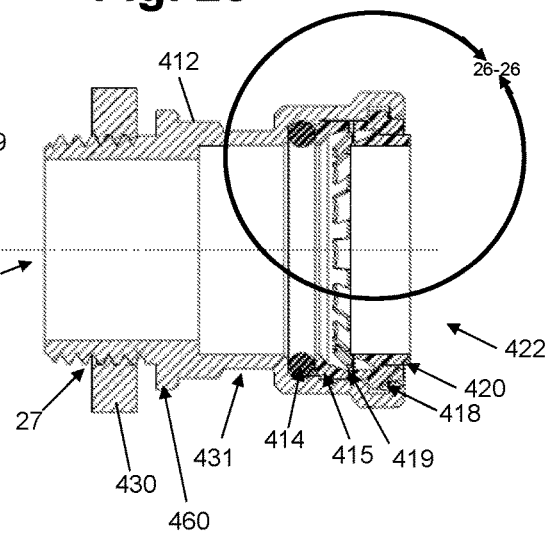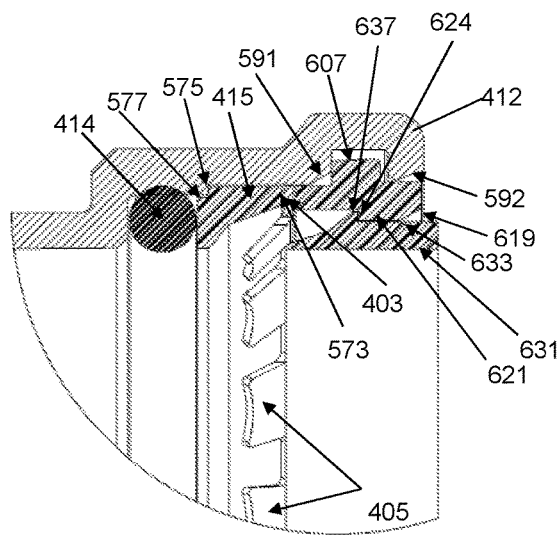

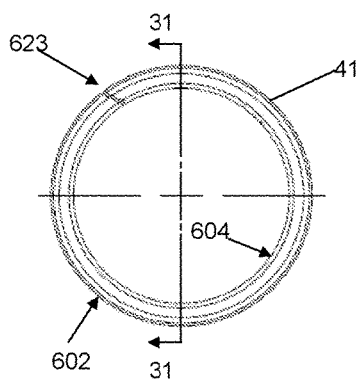
Fig. 30
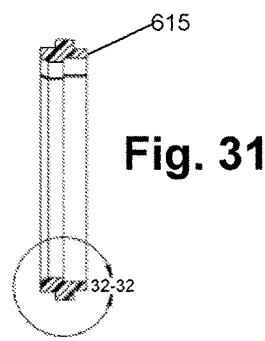
Fig. 31
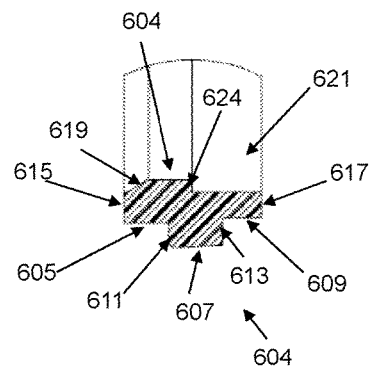
Fig. 32
Fig. 33
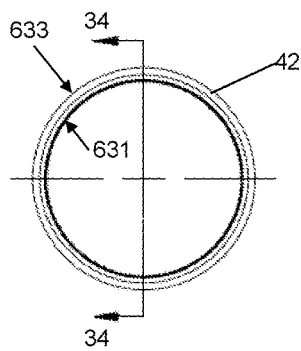
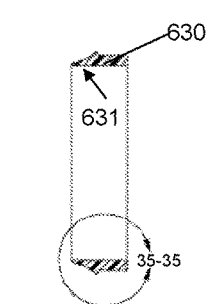
Fig. 34
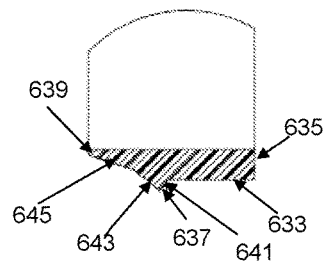
Fig. 35

INTEGRATED PIPING CONDUIT WITH ADAPTOR DEVICE AND METHOD

FIELD OF THE INVENTION

The present invention relates to piping conduits, and more particularly to a push-to-connect fitting adaptor device, conduit and method that facilitates protection of contents.

BACKGROUND OF THE PRESENT INVENTION

Piping systems exist to facilitate the flow of fluids (e.g., liquid, gas (such as air) or plasma), contain contents internally and provide other functions. For example, piping systems can include conduits that maintain electrical wiring, effectively bundling and containing wiring within a confined and protected area, so that the inserted wires can be collectively transported, shielded and joined from one point to another. In many instances, one of the end points for the conduit is an electrical box. For purposes of the present disclosure, the term "tube", "pipe", "piping", "conduit", "conduit element" or "piping element" will be understood to encompass one or more pipes, tubes, conduits, piping elements and/or tubing elements, and may be used interchangeably.

Electrical boxes, which can be referred to as utility boxes, can come in a variety of shapes and sizes, and generally operate to enclose wire connections for indoor electrical applications such as light switches, electrical outlets, fan switches and similar applications. Electrical boxes can be designed for use indoors, outdoors, in an exposed fashion outside of a wall, and in a hidden fashion within a wall, for example. Invariably, electrical boxes include openings to facilitate wiring connections and mounting in desired locations. Various conduits can be employed for collecting and facilitating connection wires through interfacing with one of the electrical box openings, thereby making it safer and easier to connect wires entering from the outside of the box to power sources and ground lines inside of the box, for example. As a specific example, an indoor electrical box for a light switch may have wiring entering the box from a central home power source, and may separately have wiring entering the box from the lighting fixture to be controlled by the light switch. The home power source wiring is connected to the light switch, and the lighting fixture wiring is also connected to the light switch, after which the lighting fixture can be controlled from the electrical box housing the described connections. If the wiring is not securely maintained, or the box improperly positioned or secured, problems can result.

The conduits or piping connections for managing loose wires are generally tube-shaped elements with a hollow interior for permitting wiring to pass through. Such conduits are useful in properly protecting the wires and cables contained therein. If unprotected, the loose wires and/or cables can be damaged, cut (such as against a metal edge of the electrical box opening) and can potentially cause a short circuit, shock, or fire. While code regulations exist to help prevent these problems, various installations may not meet code requirements. When traditional conduits are positioned within an electrical box opening, they may be unsecured, or possibly secured through a basic form of attachment such as a threaded engagement.

In recent years, push-fit technology has been employed with piping systems, and particularly with plumbing systems, to reduce the dangers and time involved in soldering joints and other connection methods. Push-fit methods require minimal knowledge of pipe fittings and involve far fewer materials than soldering. For example, one may only need the pipes, quick-connect fittings, a chamfer/de-burring tool and tubing cutter in order to connect pipes using push-fit technology. The steps involved in connecting piping systems using push-fit technology can be outlined as follows. First, the pipe is cut to the appropriate length and the end of the pipe is cleaned with the de-burring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal. Accordingly, no wrenches, clamping, gluing or soldering is involved. Push-fit and/or quick-connect technology for piping systems can be obtained, for example, through Quick Fitting, Inc. of Warwick, R.I., USA, suppliers of the CoPro® line of push fittings and related products. Also, such technology is described, for example, in U.S. Pat. Nos. 7,862,089, 8,205,915, 8,210,576, 8,398,122, and 8,480,134, the disclosures of which are incorporated herein by reference in their entireties.

SUMMARY

The present invention provides, in part, a push-to-connect fitting integrated conduit with adaptor device and method that facilitates the re-use of push fittings without damage to the fitting elements or the pipe, while also facilitating connection to boxes such as electrical boxes in a manner that meets requirements and saves time for professionals dealing with the otherwise challenging management of multiple wires, cables and/or connections. The present invention connects piping and utility boxes using no tools, clamps, solder or glues, while creating a highly effective seal at the connected joining area. Further, the present invention can incorporate an integrated release pusher and locking mechanism that allows for quick locking and unlocking of piping elements within a fitting. In embodiments of the present invention, the packing arrangement is also tamper-resistant, and can be provided in accordance with the devices, systems and methods described, for example, in co-owned and pending U.S. Pat. No. 9,068,680 issued Jun. 30, 2015 and U.S. application Ser. No. 14/291,740, both filed on Jun. 2, 2014, the disclosures of which are hereby incorporated by reference in their entireties.

In various embodiments, the quick connection pipe joint assembly package provided as part of the present invention employs a lockable release pusher that, when in the unlocked position, permits the pusher to move axially inwardly of the fitting, lifting teeth of a fastening ring and thereby facilitating the insertion and release of a cylindrical object such as a piping element held within the fitting. When a piping element is desired to be removed, axially applied pressure can be provided again to the release pusher, lifting the fastening ring teeth off of the inserted pipe to allow it to be removed. In one embodiment of the present invention, the release pusher is permanently secured to the fitting and is part of the packing arrangement.

For purposes of the present disclosure, a fitting can encompass a valve member and other piping elements including, but not limited to: a coupling joint, an elbow joint, a tee joint, a stop end, a ball valve member, tubing and other objects having substantially cylindrical openings. In one embodiment of the present invention, one or more sealing member gasket inserts (e.g., O-ring members) fit within a sealing compartment defined in the interior of the fitting. A sealing ring stabilizer element can also be provided to provide support for the one or more sealing rings. In addition, at each pipe receiving end of the fitting, a locking compartment is machined into the interior wall of the fitting to receive other members, such as, for example, a snap ring member and a locking pusher member and to assist in retaining the edges of the fastening ring. The interior compartments and housing elements provide integrated support for the sealing members and fastening ring when opposing force is applied to piping elements that have been inserted into the fitting.

Aspects of the present invention further provide a connector or adaptor device that can be positioned in or through an opening in a utility or electrical box and secured thereto, while being positioned and secured at the other end to a conduit fitting device, which can house various embodiments of fitting insertion components to permit a piping or conduit element to be removably secured therein. Such aspects can further include a releasable locking component as described above and in the references incorporated by reference noted above, for example. The fitting can be considered a conduit, and the combined fitting and adaptor device can be considered a conduit, in accordance with various embodiments of the present invention.

Other methods, devices and arrangements as described herein are provided by the present invention.

BRIEF DESCRIPTION OF THE DRAWINGS

FIG. 3 is a front elevational view of one embodiment of the arrangement of the present invention positioned in front of a utility box.

FIG. 4 is an exploded cross-sectional view of the arrangement as taken along line 4-4 of FIG. 3.

FIG. 15 is a front elevational view of a piping element or fitting in accordance with embodiments of the present invention.

FIG. 16 is a right side cross-sectional view of the piping element of FIG. 15, taken along the line 16-16 of FIG. 15.

FIG. 17 is an enlarged view of the portion of the piping element taken from encircled portion 17-17 of FIG. 16.

FIG. 24 is a front cross-sectional view of a fitting in accordance with embodiments of the present invention.

FIG. 25 is a front cross-sectional view of a conduit arrangement with adaptor in accordance with embodiments of the present invention.

FIG. 26 is an enlarged view of the portion of the conduit arrangement taken from encircled portion 26-26 of FIG. 25.

FIG. 30 is a front elevational view of a pusher locking member in accordance with embodiments of the present invention.

FIG. 31 is a right side cross-sectional view of the pusher locking member taken along line 31-31 of FIG. 30.

FIG. 32 is an enlarged view of the portion of the pusher locking member taken from encircled portion 32-32 of FIG. 31.

FIG. 33 is a front elevational view of a release pusher in accordance with embodiments of the present invention.

FIG. 34 is a right side cross-sectional view of the release pusher taken along line 34-34 of FIG. 33.

FIG. 35 is an enlarged view of the portion of the release pusher taken from encircled portion 35-35 of FIG. 34.

DETAILED DESCRIPTION OF THE PREFERRED EMBODIMENTS

Figure 12:
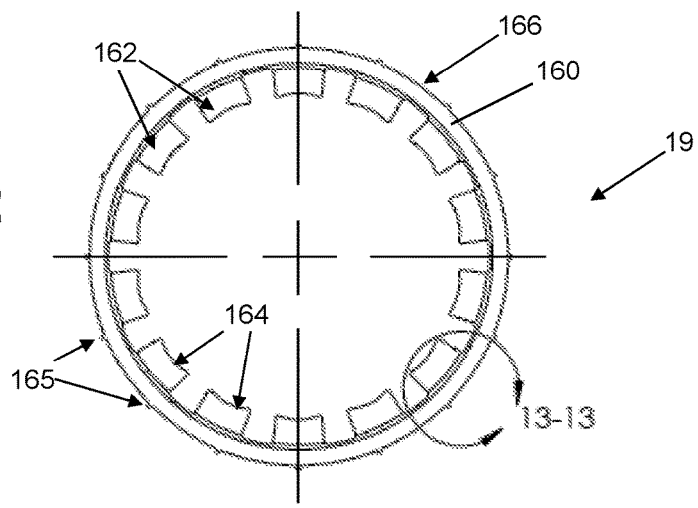
FIG. 12 is a front elevational view of a fastening ring in accordance with embodiments of the present invention.
Figure 14:
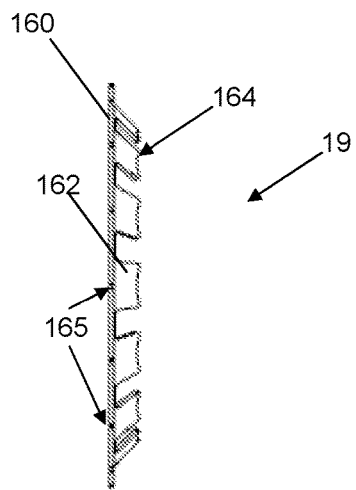
FIG. 14 is a left side view of the fastening ring of FIG. 12.
Figure 13:
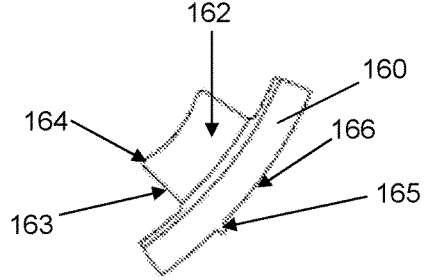
FIG. 13 is an enlarged view of the portion of the fastening ring taken from encircled portion 13-13 of FIG. 11.
Figure 19:
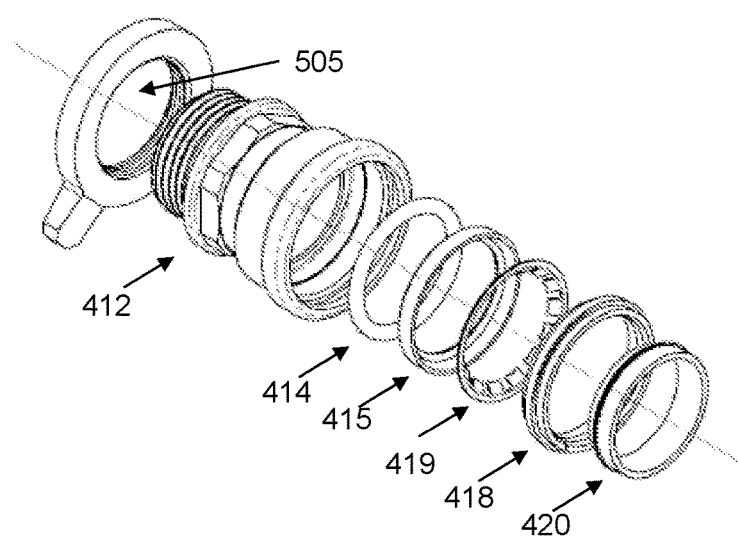
FIG. 19 is an exploded front perspective view of a conduit arrangement with adaptor in accordance with embodiments of the present invention.
Figure 20:
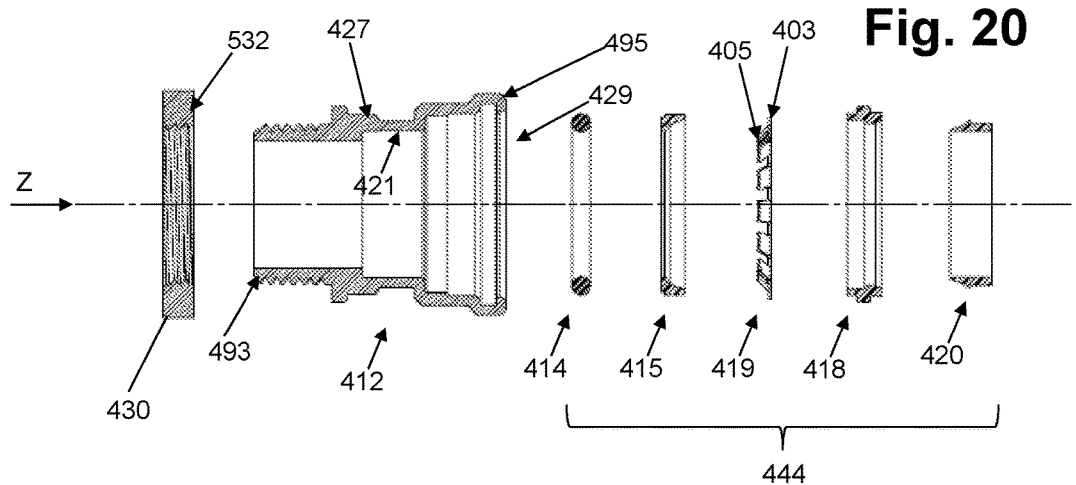
FIG. 20 is a front cross-sectional view of a conduit arrangement with adaptor in accordance with embodiments of the present invention.

In the conduit assembly 10 of embodiments of the present invention as shown in FIGS. 1 through 17, elements of the joint assembly as shown include: a fitting (i.e., fitting body member) 12 having an interior wall 21, an exterior wall 27, end walls 23, 25, one or more sealing members 14 (which can be optionally lubricated), a fastening ring 19, a pusher locking member 18 and a release pusher 20. The fastening ring 19, sealing member(s) 14, pusher locking member 18, release pusher 20 and various other internal components, together, and in subset combinations, provide embodiments of a packing arrangement employable in accordance with embodiments of the present invention, and each has a substantially ring-shaped body forming an opening extending through the body along axis A. The interior wall 21 forms an axial opening or cavity 29, which allows for smooth and snug engagement of an external conduit, piping or tubing element external surface (not shown). As noted above, push-to-connect technology for piping and conduit systems that can be employed in accordance with embodiments of the present invention is shown and described in the above-referenced patent documents. In various embodiments of the present invention, as shown in FIGS. 12 through 14, for example, the fastening ring 19 can be provided with a base 160, and a plurality of individual teeth 162 extending therefrom, wherein the teeth are provided with side edges 163 and a radially internal edge 164. In various embodiments of the present invention, the fastening ring 19 has a bifurcated design, and edges 164 are formed in a curved fashion so as to facilitate gripping action against an inserted piping element, which may be a galvanized steel pipe, for example. In various additional embodiments of the present invention, as shown in FIGS. 12 through 14, for example, the radially outer surface 166 of the base 160 of the fastening ring 19 has radially extending nubs 165 that extend radially outwardly from surface 166. These nubs 165 can be spaced substantially equidistantly along the surface 166, and facilitate a gripping action against the interior of the fitting 12 when installed. It will be appreciated that no corresponding indentations in the interior surface of the fitting 12 are required in order to adequately receive the embodiments of the fastening ring 19 containing the nubs 165. It will further be appreciated that, while fastening ring 419 in FIGS. 19, 20 and 25 is shown without nubs 165, such ring 419 can be provided with nubs 165 similar to those shown in FIGS. 12 through 14 in various embodiments of the present invention.

Figure 1:
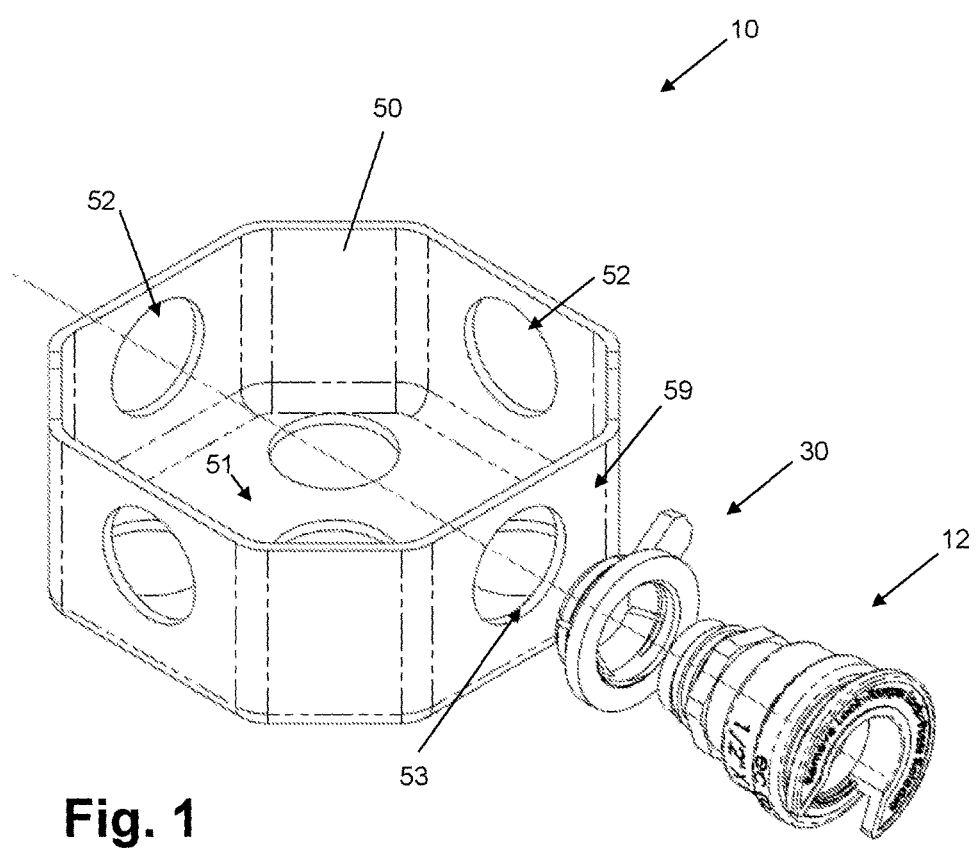
FIG. 1 is an exploded front perspective view of a conduit arrangement with adaptor in accordance with embodiments of the present invention.
Figure 2:
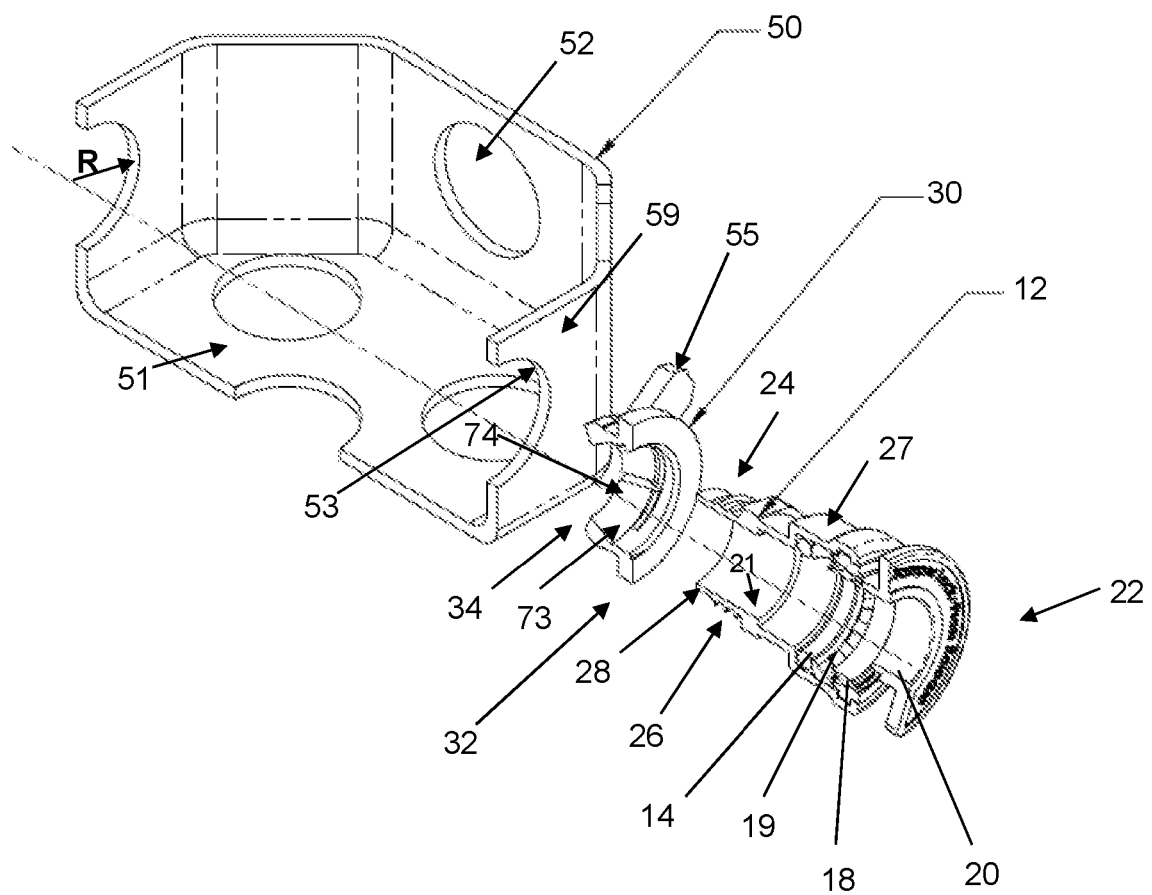
FIG. 2 is a perspective view showing the elements of the arrangement of FIG. 1 in cross-section.

As further shown in FIG. 2, the release pusher 20 can be positioned at a first end 22 of the fitting 12, and an adaptor mounting end 25 can be positioned adjacent an adaptor 30. Further, as shown in FIGS. 2 and 4, the exterior surface of the fitting 12 at the adaptor mounting end 24 can be provided with an external thread 26 and a wedge portion 28, for engaging the adaptor 30 as described further herein.

Figure 5:
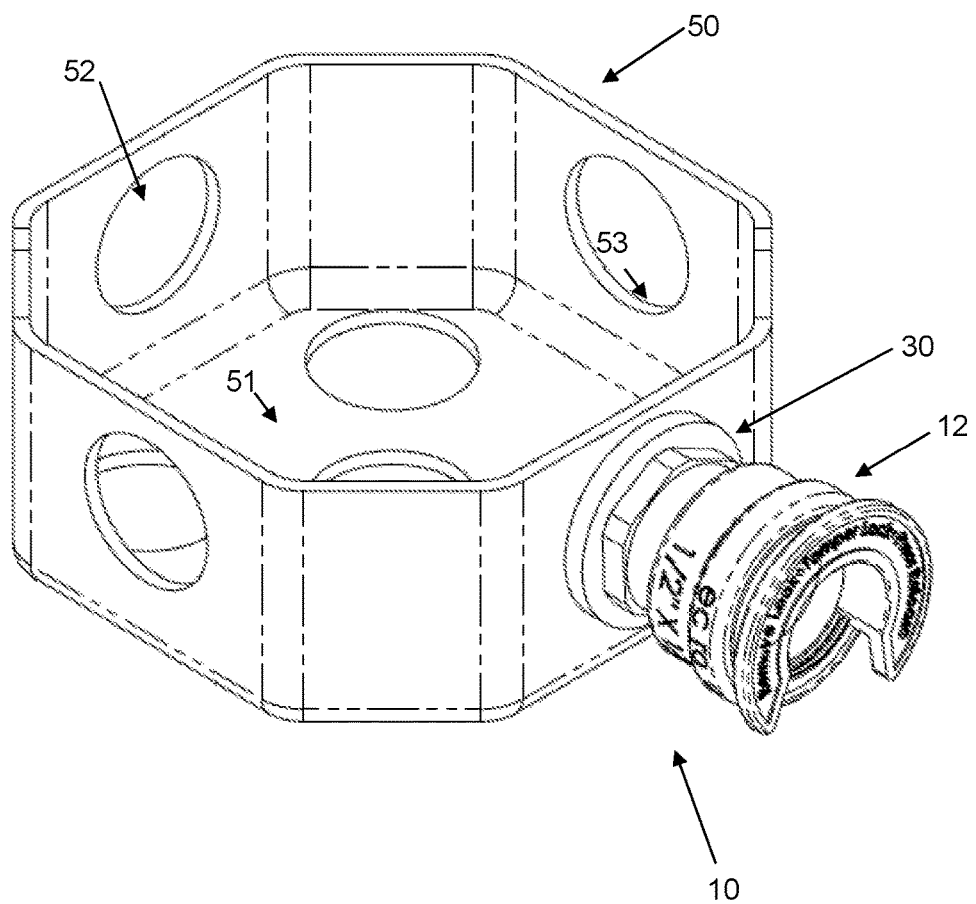
FIG. 5 is a front perspective view of a conduit arrangement with adaptor as installed in a utility box in accordance with embodiments of the present invention.
Figure 18:
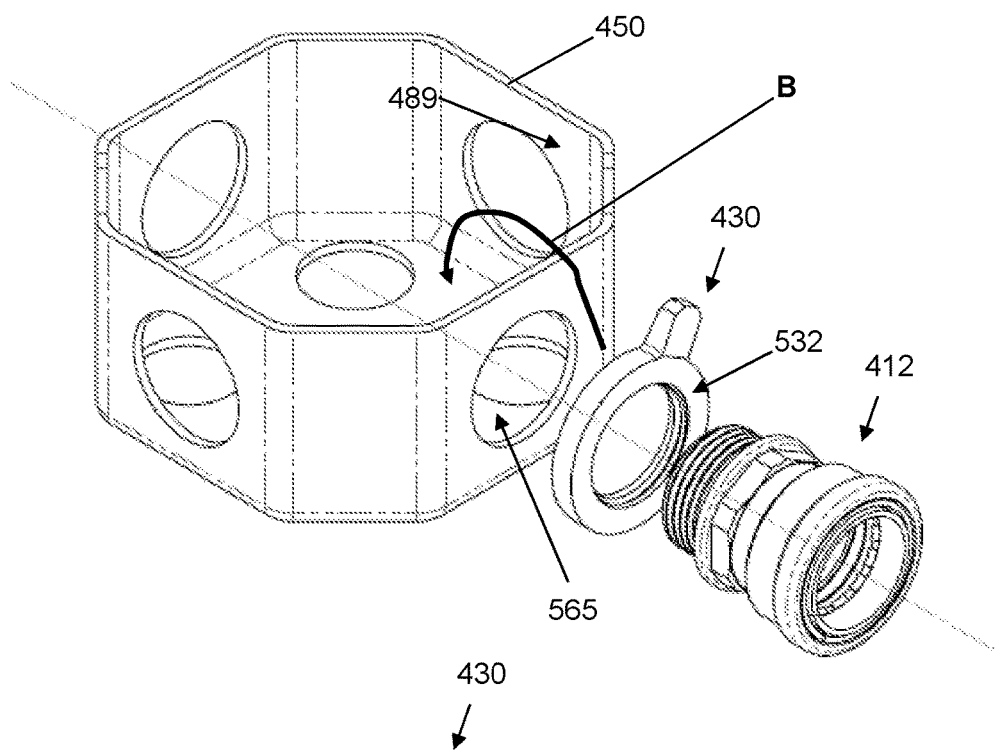
FIG. 18 is an exploded front perspective view of a conduit arrangement with adaptor with a utility box in accordance with embodiments of the present invention.

As shown in FIGS. 16 through 17, the fitting 12 further includes a collar portion 60 extending radially outwardly of the fitting exterior wall 27 and further extending radially inwardly of the fitting interior wall 21. The collar portion 60 includes an axially inner surface 62 and an axially outer surface 64, wherein the axially outer surface 64 has a pipe engaging portion 65 within the fitting cavity 29, and wherein the collar portion axially inner surface 62 has an adaptor engaging surface 66 external of the cavity 29. The external surface 67 of the collar portion 60 can be considered part of the exterior wall 27 of the fitting 12. As shown in FIGS. 16 through 18, the collar portion 60 extends radially outwardly of the wall 27 between the approximate mid-section 31 of the fitting 12 and the wedge portion 28 of the fitting 12. By so doing, the collar portion 60 provides a surface 66 against which the adaptor 30 can engage, as described elsewhere herein. FIG. 5 illustrates the connection of the fitting 12 with the adaptor 30, and with the joined conduit 10 inserted and secured in box 50.

In various embodiments of the present invention, as shown in FIG. 17, for example, the radial distance C from the fitting axis A to the approximate mid-point 69 of the thread 26 can range from approximately 0.26 inches to approximately 2.78 inches, inclusive, and the radial distance D from the axis A to the tip 71 of the thread 26 can range from approximately 0.51 inches to approximately 3.03 inches, inclusive. Further, in various embodiments, the height E of the thread 26 can range from approximately 0.125 inches to approximately 0.75 inches, inclusive, and the axial distance F between radially extending walls 72 and/or thread heights of the thread 26 can range from approximately 0.005 inches to approximately 0.250 inches, inclusive.

In various embodiments, the interior surface 21 of the fitting 12 can extend in a stair step fashion to accommodate the connections and purposes of the fitting described herein. For example, the interior surface 75 of the wedge portion 28 extends a radial distance from axis A that is less than the radial distance from axis A to the interior surface 76 of the intermediate portion 31 of the fitting, and the radial distance from axis A to the interior surface 76 is less than the radial distance from axis A to the interior surface 77 of a sealing ring compartment 97. Further, the radial distance from axis A to the interior surface 77 is less than the radial distance from axis A to the interior surface 78 of a fastening ring compartment 98, and the radial distance from axis A to the interior surface 78 is less than the radial distance from axis A to the interior surface 79 of a pusher locking member compartment 99. Also, the radial distance from axis A to the interior surface 78 is greater than the radial distance from axis A to the interior surface 96 of the end wall 25. In this way, interior surface 96 is part of a pocket or compartment 99 for retaining a pusher locking member 18 shown in FIGS. 2 and 4, when a suitable packing arrangement is employed in the fitting. In operation, a packing arrangement such as that described above in connection with FIGS. 2 and 4 is positioned within compartments 97, 98 and 99, and a piping element is inserted into the cavity 29. The release pusher 20 lifts the fastening ring teeth 162 so that the piping element can be inserted, and the piping element will stop at the wall 65 of the collar portion 60 of the fitting 12. Once in place, the piping element can be retained within the cavity 29 and restricted from axial movement back out of the cavity by the fastening ring teeth 162, which make contact with the piping element outer wall once the release pusher 20 is released. In addition, wiring can be inserted through the opening 29, any inserted piping element, and thus into the utility box 50 for the purposes described herein.

Figure 9:
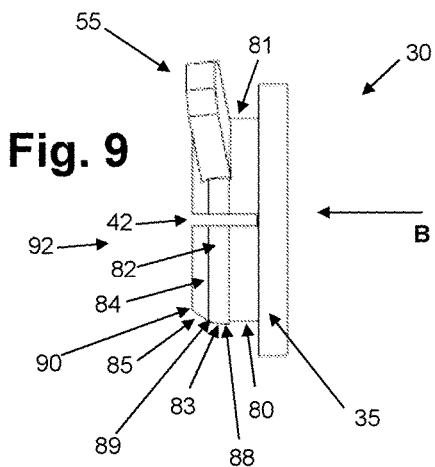
FIG. 9 is a right side view of the adaptor of FIG. 8.
Figure 10:
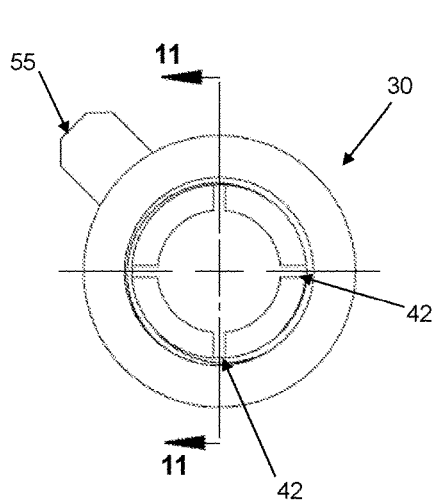
FIG. 10 is a rear elevational view of the adaptor of FIG. 8.
Figure 11:
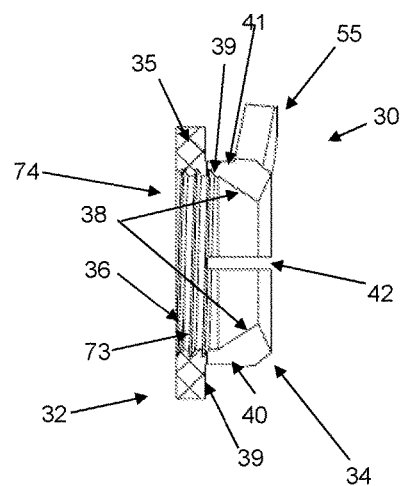
FIG. 11 is a left side cross-sectional view of the adaptor of FIG. 8 as taken along line 11-11 of FIG. 10.

As shown in FIGS. 2, 4 and 8 through 11, the adaptor 30 has a head portion 35 at a first end 32, and a body portion 40 integrally formed with and extending from the head portion 35 to a second end 34. The adaptor 30 can be substantially ring-shaped in the sense that the adaptor 30 has an interior surface 73 forming an opening 74 extending axially through the head portion 35 and the body portion 40 along axis B. The head portion 35 can extend radially outwardly of the body portion 40, as shown in FIGS. 9 and 11, for example. The body portion includes an interior wall 38 and an exterior wall 41. In various embodiments, the body portion 40 comprises a neck portion 80, a shoulder portion 82 and a ledge portion 84, wherein the neck portion 80 has an external surface 81 that extends axially from the head portion 35 in substantially parallel relation to axis B. The shoulder portion 82 further has an outer surface 83 and the ledge portion 84 also has an outer surface 85. Outer surfaces 81, 83 and 85 form the exterior wall 41 of the adaptor 30. In various embodiments, the radial distance from axis B to the outer surface 81 of neck portion 80 is less than the radial distance from axis B to the outer surface 83 of shoulder portion 82. In various embodiments, the outer surface 83 of shoulder portion 82 extends from a longer radial distance from axis B at edge 88 adjacent neck portion 80 to a shorter radial distance from axis B at edge 89 adjacent ledge portion 84. Such a relative dimensioning can assist, for example, with inserting the adaptor 30 into a box 50 during installation, for example. In specific embodiments, the outer surface 83 of shoulder portion 82 extends substantially linearly from edge 88 to edge 89. The relative dimensions of the neck 80, shoulder 82 and ledge 84 portions help provide a strong base for supporting the ear member 55. Further, the radial distance from axis B to the outer surface 81 of neck portion 80 matches the radius R of the opening 52 in the box 50 to ensure snug engagement of the adaptor 30 within the box 50.

In various embodiments of the present invention, the outer surface 85 of ledge portion 84 of adaptor 30 extends radially inwardly from edge 89 adjacent shoulder portion 82 to edge 90 forming the axially inner end 92 of the adaptor 30. In this way, a portion of the outer surface 85 has a radial distance from axis B that exceeds the radial distance from axis B to the outer surface 81 of the neck portion 80, while outer surface 85 also has a portion with a radial distance from axis B that is less than the radial distance from axis B to the outer surface 81 of the neck portion. In specific embodiments, the outer surface 85 of ledge portion 84 extends substantially linearly from edge 89 to edge 90 in chamfered form. In other embodiments, the outer surface 85 can be rounded. With the arrangement as shown in FIGS. 9 and 11 and described above, the adaptor 30 maintains core strength at neck portion 80 while providing stability for ear member 55 as described hereinafter.

As further shown in FIG. 2, the first end 32 of the adaptor 30 is adapted to engage the adaptor mounting end 24 of the fitting 12. In embodiments of the present invention, the thread 26 on the adaptor mounting end 24 of the fitting 12 can threadingly engage an interior thread-receiving cavity 36 of the adaptor 30. Further, the wedge portion 28 of the fitting 12 can engage interior wall(s) 38 of the adaptor 30 such that, as the fitting threadingly engages the adaptor, the wedge portion 28 pushes the interior wall 38 of the adaptor outwardly, assisting in secure connection between the adaptor 30 and a utility box 50 as described elsewhere herein. In various embodiments of the present invention, the thread arrangement can include a buttress thread, a standard thread, a rectangular thread, a square thread and/or a double buttress thread design. The thread design can include, for example, a ½ inch thread or a ¾ inch thread. As shown in FIGS. 15 through 17, for example, the fitting 12 can be provided such that the thread 26 on the adaptor mounting end 24 has an outer diameter D, a pitch diameter and a thread pitch consistent with the discussion elsewhere herein. The dimensions of these measurements can vary depending upon the implementation, but can generally result in a very tight fitting that helps to keep the fitting securely connected with the box.

Figure 6:
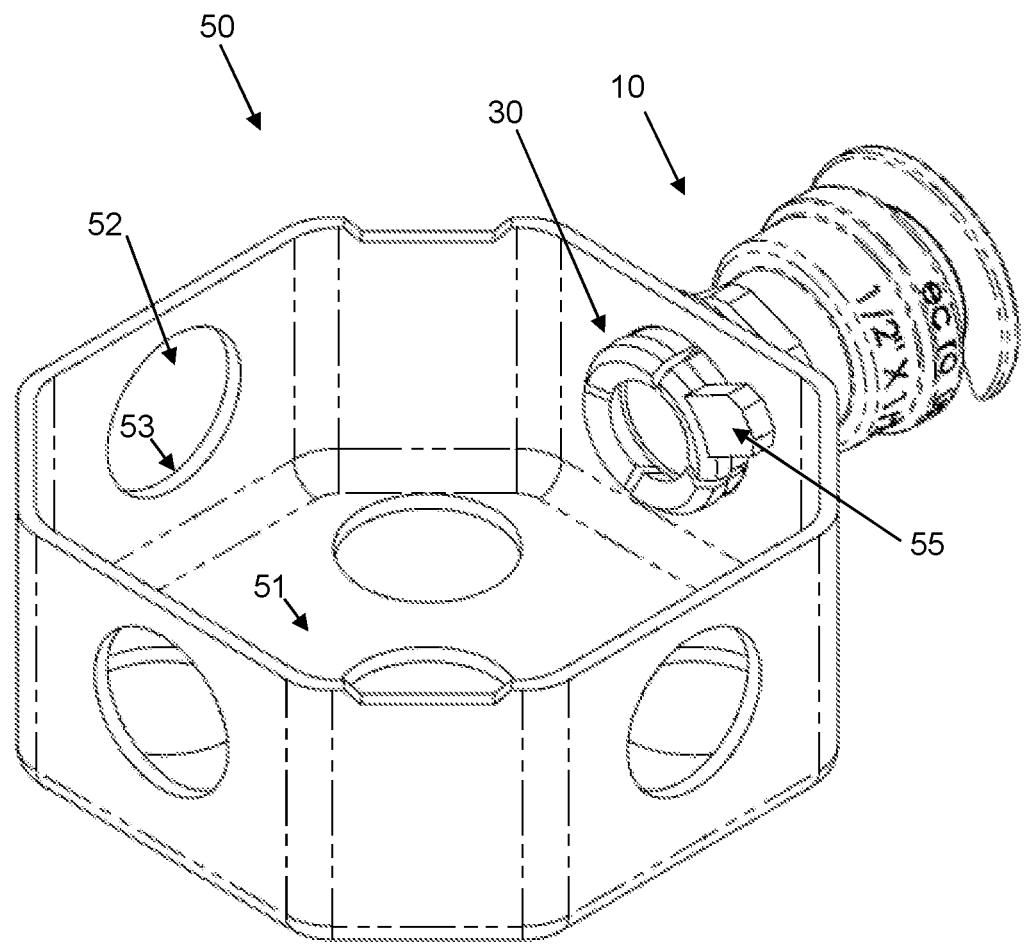
FIGS. 6 and 7 are rear perspective views of a conduit arrangement with adaptor as installed in a utility box in accordance with embodiments of the present invention.
Figure 7:
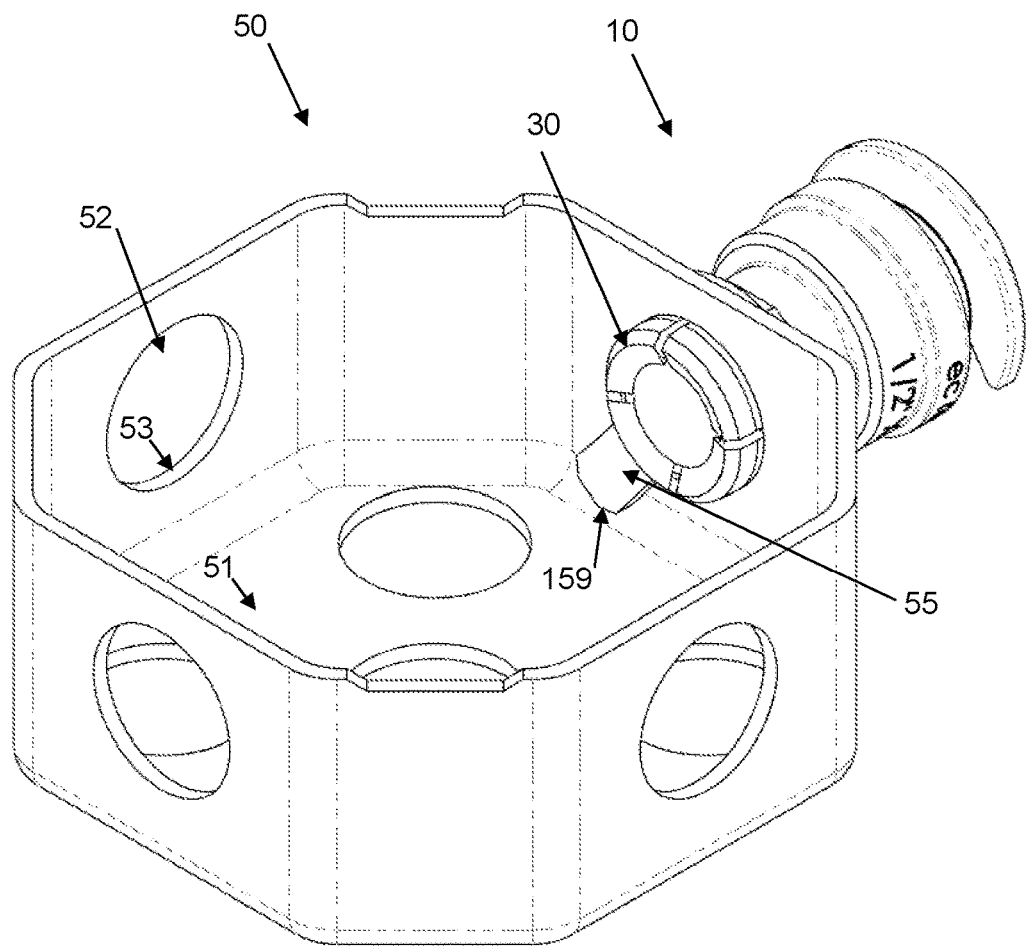
Figure 8:
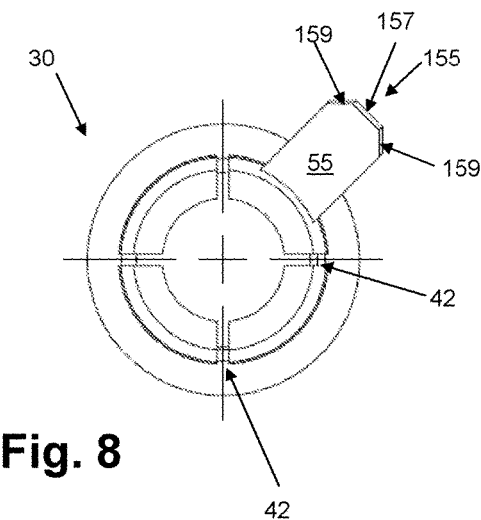
FIG. 8 is a front elevational view of an adaptor in accordance with embodiments of the present invention.

As shown in FIGS. 4 and 11, as the interior wall 38 moves away from the head portion 35 and axially outwardly thereof, the interior wall 38 also extends radially inwardly. In various embodiments, this radially inward movement begins from a first radial inner wall point 39, where the inner wall is of substantially the same radius as the thread-receiving cavity 36 of the adaptor 30. As the wall 38 moves axially outwardly to the second end 34, the wall radius becomes smaller. In embodiments of the present invention as shown in FIGS. 2 and 6 through 11, the adaptor 30 further includes ear member 55 extending outwardly from the outer surface of the adaptor 30 at or near the second end 34. In various embodiments, the ear member 55 is secured to the outer surface 83 of shoulder portion 82, and in additional embodiments, the ear member 55 is secured to the outer surface 83 of shoulder portion 82 and the outer surface 85 of ledge portion 84. In various embodiments, the ear outer edge 155 is provided with a top squared off edge 157, and chamfered side edges 159 such that the full side edges 159 can mate with the floor 51 of the box 50 as it is rotated during operation, as shown in FIG. 7. In this way, the ear member 55 provides greater and more stable resistance to turning, which facilitates secure connection of the adaptor to the fitting during operation.

The ear member 55 can be of varying shapes, thicknesses and sizes, and can extend both radially and axially outwardly from the body portion 40 so as to be capable of suitably engaging an inner wall 51 of a utility box 50 when installed. It will be appreciated that the ear member 55 can thus extend at least partially radially outwardly from the body portion 40 as well as at least partially axially outwardly of the body portion 40, and that the radial outward extension of the ear member 55 does not necessitate an extension that is perpendicular to the adaptor axis. In various embodiments, the ear member 55 extends primarily radially outwardly from the body portion 40. It will be appreciated that by extending outwardly from the outer surface 83 (and also optionally outer surface 85), the ear member 55 has a substantially flat surface that is angled radially outwardly and axially outwardly from the body portion 40 in order to operate smoothly when engaging and disengaging from the inner wall 51 of utility box 50.

In addition to the above, the body portion 40 of the adaptor 30 can be formed with one or more axially extending grooves 42. The grooves 42 permit the body member 40 to flex during operation, such that the body member 40 can extend through an opening 52 in a utility box 50 during installation or de-construction. In embodiments of the present invention, the grooves 42 extend in a direction that is coaxially aligned with the axis of the opening through the adaptor 30. In other embodiments, the grooves 42 can extend at non-coaxial angles. In various embodiments, the grooves 42 extend from the head portion 35 to the second end 34 of the adaptor.

The electrical and/or utility box 50 shown in the drawings is representative of various utility boxes where manual wiring connections can take place. As shown in FIGS. 1 through 7, the box 50 includes a floor 51 and one or more openings 52. Typically, the openings 52 are formed in the box and may have rough edges, but can generally be formed with a substantially rounded or circular shape.

For installation, the second end 34 of the adaptor 30 can be inserted through an opening 52 in the box 50, whereby the ear member 55 is most likely inserted through the opening first, followed by the body portion 40. Once the adaptor is through the opening 52, it can be pushed with manual pressure at the head portion 35 until a base surface 39 of the head portion 35 abuts the outside surface 59 of the box 50. At such time, the ear member 55 resides completely within the box 50, as shown in FIGS. 5 through 7. It will also be appreciated that the outer surface 81 of the neck portion 82 of the body portion 40 mates with the edges 53 of the opening 52 when installed. The fitting can then be inserted into the first end 32 of the adaptor 30, whereupon the wedge portion 28 of the fitting engages or nearly engages the inner wall 38 of the adaptor, and the external thread 26 of the fitting engages the thread-receiving cavity 36 of the adaptor 30. As the fitting is rotated (e.g., clockwise), the threaded engagement of the fitting 12 with the adaptor 30 moves the wedge portion 28 further within the adaptor, and begins to put pressure on the internal wall 38 to expand outwardly. The expansion of the internal wall 38 outwardly is facilitated by the gaps 42, and thus the body portion 40 can more snugly engage the edges 53 of the opening 52 of the box 50. Further, the rotation of the fitting 12 and engaged adaptor 30 causes the ear member 55 to rotate such that outer edge 159 will contact the floor 51 of the box, as shown in FIG. 7. In this way, the adaptor and fitting are snugly engaged with the box, and a pipe or conduit element can then be inserted into the first end 22 of the fitting as described elsewhere herein. Any wiring or cabling within the conduit element can then be drawn through the fitting and adaptor for ready manipulation within the box 50.

In embodiments, the fitting 12 and can be forged CW617N brass, with full porting and full flow fitting, for example. In other embodiments, the fitting 12 can be a plastic material. Similarly, the adaptor 30 can be plastic, to provide slight malleability for insertion through an opening 52 in the utility box 50 or other compartment where employed.

In the conduit assembly 400 of embodiments of the present invention as shown in FIGS. 18 through 37, elements of the joint assembly as shown include: a fitting (i.e., fitting body member) 412 having an interior wall 421, an exterior wall 427, end walls 493, 495, one or more sealing members 414 (which can be optionally lubricated), a sealing member stabilizer 415, a fastening ring 419, a pusher locking member 418 and a release pusher 420. The fastening ring 419, sealing member(s) 414, pusher locking member 418, release pusher 420 and various other internal components, together, and in subset combinations, provide embodiments of a packing arrangement 444 employable in accordance with embodiments of the present invention, and each has a substantially ring-shaped body forming an opening extending through the body along axis Z. The interior wall 421 forms an axial opening or cavity 429, which allows for smooth and snug engagement of an external conduit, piping or tubing element external surface (not shown). As noted above, push-to-connect technology for piping and conduit systems that can be employed in accordance with embodiments of the present invention is shown and described in the above-identified patent documents, which are incorporated by reference herein in their entireties.

In various embodiments of the present invention, as shown in FIG. 20, for example, the fastening ring 419 can be provided with a base 403, and a plurality of individual teeth 405 extending therefrom, wherein the teeth are provided with side edges and a radially internal edge, such as shown in connection with fastening ring 19 of FIGS. 12 through 14, for example. In various embodiments of the present invention, the fastening ring 419 has a bifurcated design, with edges formed in a curved fashion such as shown in connection with fastening ring 19 of FIGS. 12 through 14, for example. It will be appreciated that the fastening ring 419 can be provided with nubs similar to nubs 165 shown in FIGS. 12 through 14, and such nubs can facilitate secure engagement of the fastening ring 419 inside of the fitting 412. It will further be appreciated that fastening ring 419 can be formed as an integral, monolithic unit without a lateral split dividing one portion of the ring, and can further be formed with a lateral split.

As further shown in FIG. 25, the release pusher 420 can be positioned at a first end 422 of the fitting 412, and an adaptor mounting end 425 can be positioned for connection to an adaptor 430, which is an alternative embodiment of adapter 30. Further, as shown in FIGS. 24 and 25, the exterior surface of the fitting 412 at the adaptor mounting end 425 can be provided with an external thread 426 and a wedge portion 428, for engaging the adaptor 430 as described further herein.

Figure 21:
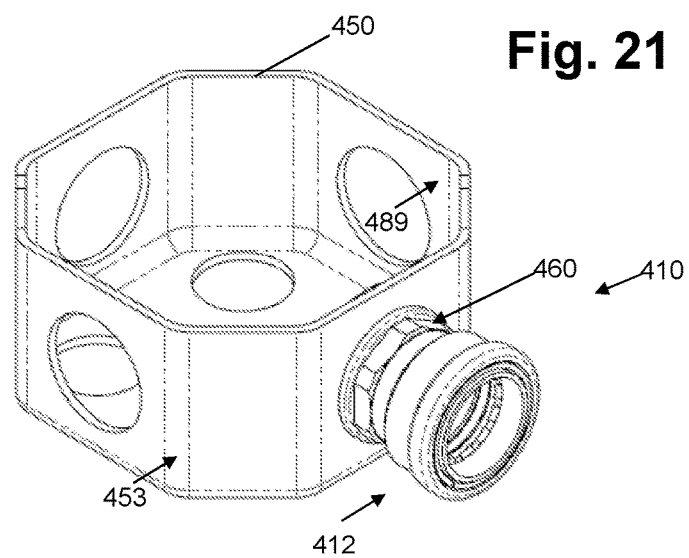
FIG. 21 is a front right perspective view of a conduit arrangement with adaptor in accordance with embodiments of the present invention as installed in a utility box.
Figure 22:
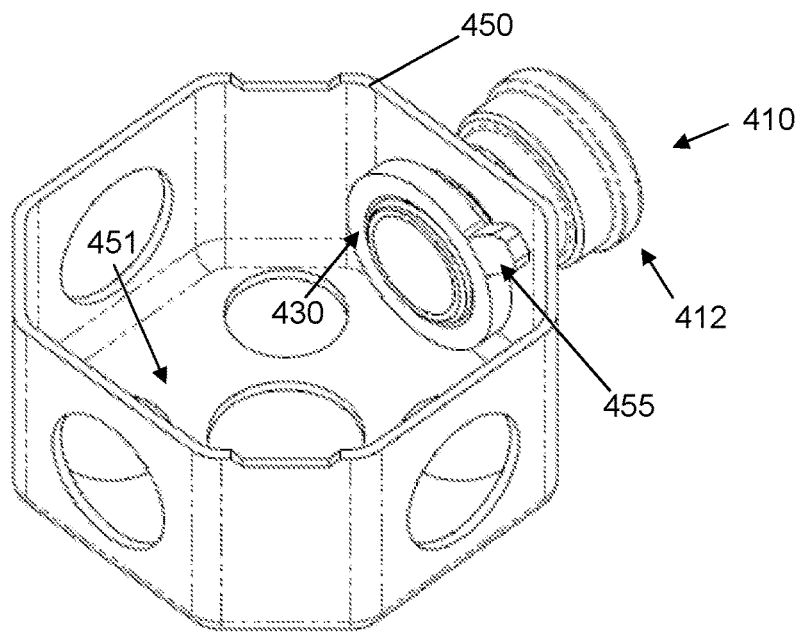
FIGS. 22 and 23 are front left perspective views corresponding to FIG. 21.
Figure 23:
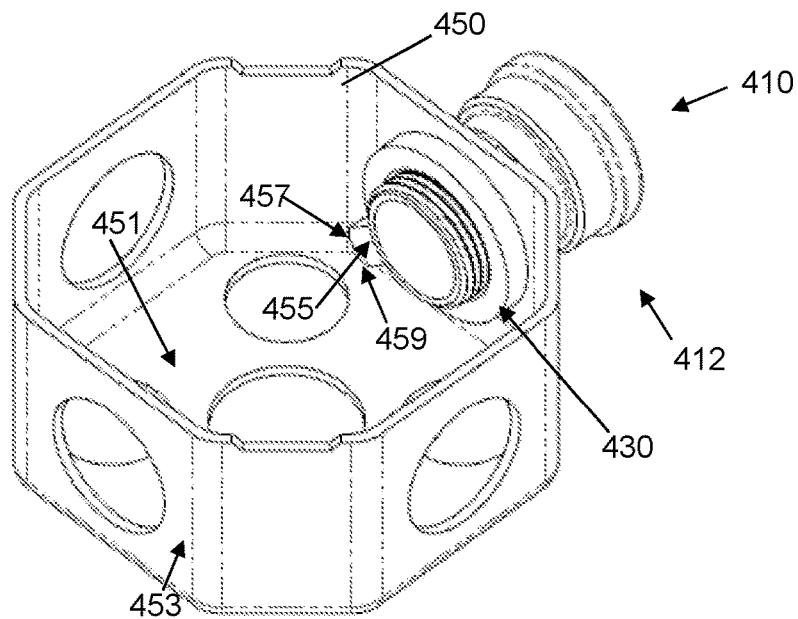

As shown in FIGS. 24 and 25, the fitting exterior wall 427 includes a mid-portion 431 and a collar portion 460 extending radially outwardly of the mid-portion 431. The collar portion 460 includes an axially inner surface 462 and an axially outer surface 464, wherein the axially outer surface 464 engages the box 450 during operation. The external surface 467 of the collar portion 460 can be considered part of the exterior wall 427 of the fitting 412. As shown in FIGS. 24 through 25, the collar portion 460 extends radially outwardly of the wall 427 between the approximate midsection 431 of the fitting 412 and the wedge portion 428 of the fitting 412. By so doing, the collar portion 460 provides a surface 464 against which the outer wall 453 of the box 450 can engage, as described elsewhere herein. FIGS. 21 through 23 illustrate the connection of the fitting 412 with the box 450 and adaptor 430, and with the joined conduit 410 inserted and secured therewith. As shown therein, the adapter 430 is secured to the inside wall 489 of the box 450 and the fitting 412 is secured to the outside wall 453.

In various embodiments, the interior wall 421 of the fitting 412 can extend in a stair step fashion to accommodate the connections and purposes of the fitting described herein. For example, the interior surface 475 of the wedge portion 428 extends a radial distance from axis A that is less than the radial distance from axis A to the interior surface 476 of the intermediate portion 431 of the fitting, and the radial distance from axis A to the interior surface 476 is less than the radial distance from axis A to the interior surface 477 of a sealing ring compartment 497. Further, the radial distance from axis A to the interior surface 477 is less than the radial distance from axis A to the interior surface 478 of a fastening ring compartment 498, and the radial distance from axis A to the interior surface 478 is less than the radial distance from axis A to the interior surface 479 of a pusher locking member compartment 499. Also, the radial distance from axis A to the interior surface 478 is greater than the radial distance from axis A to the interior surface 496 of the end wall 425. In this way, interior surface 496 is part of a pocket or compartment 499 for retaining a pusher locking member 418 shown in FIGS. 25 and 26, when a suitable packing arrangement is employed in the fitting 412. In operation, a packing arrangement 444 such as that described above in connection with FIGS. 19 and 20 is positioned within compartments 497, 498 and 499, and a piping element is inserted into the cavity 429. The release pusher 420 lifts the fastening ring teeth 405 so that the piping element can be inserted, and the piping element will stop at the axially inner wall 465 of the wedge portion 428 of the fitting 412. Once in place, the piping element can be retained within the cavity 429 and restricted from axial movement back out of the cavity by the fastening ring teeth 405, which make contact with the piping element outer wall once the release pusher 420 is released. In addition, wiring can be inserted through the opening 429, any inserted piping element, and thus into the utility box 450 for the purposes described herein.

Figure 27:
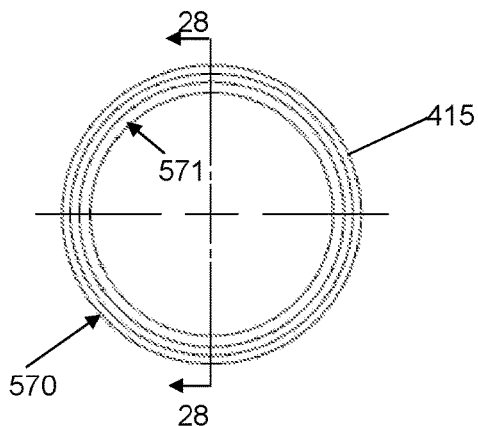
FIG. 27 is a front elevational view of a sealing member stabilizer in accordance with embodiments of the present invention.
Figure 28:
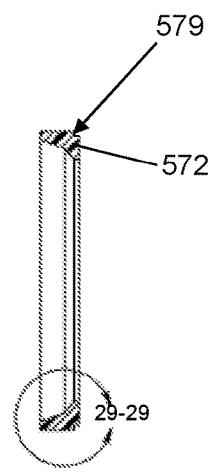
FIG. 28 is a right side cross-sectional view of the sealing member stabilizer taken along line 28-28 of FIG. 27.
Figure 29:
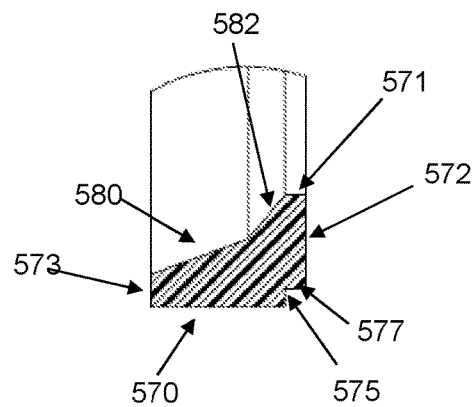
FIG. 29 is an enlarged view of the portion of the sealing member stabilizer taken from encircled portion 29-29 of FIG. 28.

As shown in FIGS. 27 through 29, the stabilizer 415 includes an exterior 570 and an interior 571 surface. In various embodiments, the stabilizer 415 is formed with an axially inner surface 572, an axially outer surface 573, a radial notch wall surface 575, an axial notch wall surface 577, a first angled inside wall surface 580 and a second angled inside wall surface 582. The notch wall surfaces 575, 577 form a notch 579 that mates with the interior of the fitting so as to properly and securely retain the stabilizer in position overlapping the sealing member 497 and fastening ring 498 compartments, as shown in FIGS. 26 and 28.

As shown in FIGS. 30 through 32, the pusher locking member 418 includes an exterior surface 602 and an interior surface 604. The exterior surface 602 can comprise an axially inner portion 605, an axially mid portion 607 and an axially outer portion 609, wherein the axially mid portion 607 extends radially outwardly of the axially inner portion 605 and the axially outer portion 609. The axially mid portion 607 also includes an axially interior wall segment 611 and an axially exterior wall segment 613. The axially mid portion 607 resides within the pusher locking member compartment 499 of the fitting 412 when installed, as shown in FIG. 26, for example. The pusher locking member further includes an axially interior wall 615, an axially exterior wall 617, an angled interior wall 619 extending from the interior wall 615 to the interior surface 604, and an axial platform segment 621 extending from the exterior wall 617 to a back wall 624 of the interior surface 604. In various embodiments of the present invention, the pusher locking member body is split as at 623, whereby the body does not form a fully connected ring, but includes a split so as to permit greater flexibility and pinching in of the circumference in order to ease the fit of the pusher locking member 418 within compartment 499 during installation.

As shown in FIGS. 33 through 35, the release pusher 420 includes a release pusher wall 630 having an inner surface 631 and an outer surface 633. The wall 630 is formed so as to include a back pushing edge 635, then diverges outwardly to form a radially outwardly extending wing 637 and converges inwardly back to an axially interior rim 639. The wing 637 is formed with a back wall 641 that extends radially outwardly as part of the outer surface 633, and angled first 643 and second 645 front walls. The rim 639 and walls 643, 645 assist in operation of the device when axial pressure is applied to the back pushing edge 635 by pushing the teeth of the fastening ring inwardly to allow for ingress and egress of tubing along inner surface 631.

Figure 36:
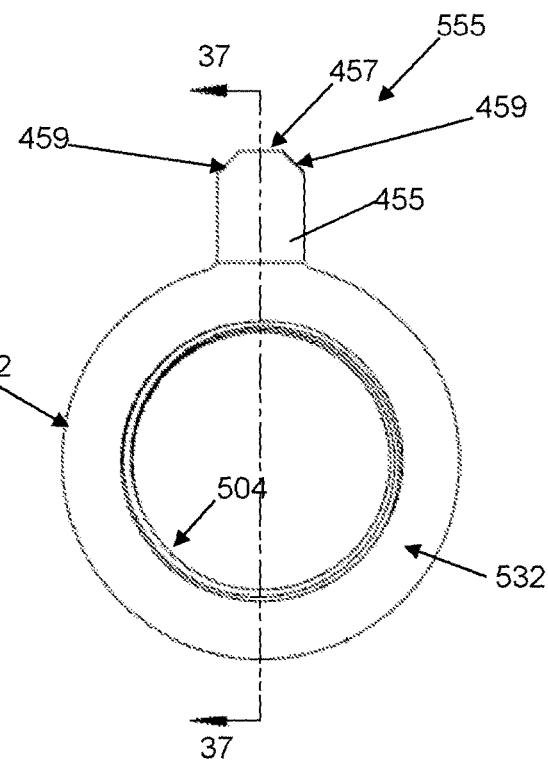
FIG. 36 is a front elevational view of an adaptor in accordance with embodiments of the present invention.
Figure 37:
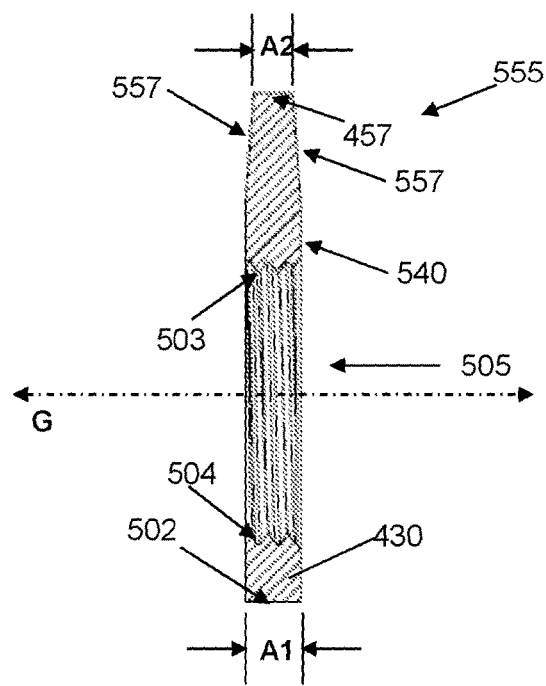
FIG. 37 is a right side cross-sectional view of the adaptor taken along line 37-37 of FIG. 36.

As shown in FIGS. 36 and 37, the adaptor 430 can be provided as a substantially ring-shaped member with a body portion 540 having an outer circumferential wall 502 and an interior thread and/or thread-receiving groove 504 formed in the interior wall 503, defining an opening 505 through the adapter 430 extending along adaptor axis G. As further shown in FIG. 25, the adaptor 430 is adapted to engage the adaptor mounting end 425 of the fitting 412. In embodiments of the present invention, the thread 426 on the adaptor mounting end 425 of the fitting 412 can threadingly engage the interior thread or thread-receiving groove 504 of the adaptor 430. In various embodiments of the present invention, the thread arrangement can include a buttress thread, a standard thread, a rectangular thread, a square thread and/or a double buttress thread design. The thread design can include, for example, a ½ inch thread or a ¾ inch thread. In various embodiments, the fitting 412 can be provided such that the thread 426 on the adaptor mounting end 425 has an outer diameter, a pitch diameter and a thread pitch consistent with the discussion elsewhere herein. The dimensions of these measurements can vary depending upon the implementation, but can generally result in a very tight fitting that helps to keep the fitting securely connected with the box.

As further shown in FIGS. 36 and 37, the adaptor 430 further includes ear member 455 extending outwardly from the outer wall 502 of the adaptor 430. In various embodiments, the ear outer edge 555 is provided with a top squared off edge 457, and chamfered side edges 459 such that the full side edges 459 can mate with the floor 451 of the box 450 as it is rotated during operation, as shown in FIG. 23. In this way, the ear member 455 provides greater and more stable resistance to turning, which facilitates secure connection of the adaptor to the fitting during operation. In various embodiments, more than one ear member is employed on the adaptor. Further, in various embodiments, the adaptor is formed from a metal material. As shown in FIGS. 36 and 37, the radial distance from the adaptor axis G to the outer edge 555 of the at least one ear member 455 is greater than the radial distance from the adaptor axis G to the adaptor body portion exterior wall 502.

The ear member 455 can be of varying shapes, thicknesses and sizes, and can extend both radially and axially outwardly from the body portion 540 of the adapter 430 so as to be capable of suitably engaging an inner wall 489 or floor 451 of a utility box 450 when installed. In various embodiments, to facilitate rotation and minimize friction against the inside wall of the utility box when the adaptor is rotated, the adaptor body portion 540 tapers from a larger thickness A1 to a smaller thickness A2 at the squared-off edge 457 along a tapering wall portion 557. The ear member 455 can help avoid the situation where a user must use a tool such as pliers or the like to hold the adaptor 430 inside of the interior wall of an electrical or utility box 450 when the fitting 412 is being secured thereto.

The electrical and/or utility box 450 shown in the drawings is representative of various utility boxes where manual wiring connections can take place, and is similar to box 50 described above and with respect to FIGS. 1 through 7.

Prior to installation of the fitting 412 and adaptor 430 with the utility box 450, the packing arrangement (e.g., 444 in FIG. 20, or subsets thereof) can be inserted into the fitting. In various embodiments, such a sequence involves inserting the sealing ring 414 into the sealing ring compartment 497 of the fitting, inserting the sealing member stabilizer 415 so as to rest partly within the sealing ring compartment 497 and partly within the fastening ring compartment 498, and such that axially inner surface 572 engages the sealing member 414. As shown in FIG. 26, the stabilizer notch wall axial surface 577 resides within the sealing member compartment 497 and the stabilizer notch wall radial surface 575 resides within the fastening ring compartment 498. Next, the fastening ring 419 is inserted such that the base 403 is positioned adjacent the stabilizer such that the fastening ring axially inner surface of the base 403 abuts the axial outer surface 573 of the stabilizer 415. It will be appreciated that the fastening ring 419 can be provided with nubs similar to nubs 165 shown in FIGS. 12 through 14, and such nubs can facilitate secure engagement of the fastening ring 419 inside of the fitting 412. It will further be appreciated that fastening ring 419 can be formed as an integral, monolithic unit without a lateral split dividing one portion of the ring, and can further be formed with a lateral split. The pusher locking member 418 is then inserted into the pusher locking member compartment 499 such that the exterior wall 617 engages the axially outer surface of the fastening ring base 403. Next, the release pusher 420 is inserted such that wing 637 is retained by the back wall 624 of the locking member 418, as shown in FIG. 26. The release pusher exterior wall 633 can then slidingly engage the platform 621 of the locking member 418 during operation, as shown in FIG. 26, for example. The interior wall 421 of the fitting 412 can include chamfered edge surfaces 591, 592 to facilitate insertion and removal of packing arrangement elements, in various embodiments.

For installation of the fitting 412 with the adaptor 430 and utility box 450, the end face 532 of the adaptor 430 can be positioned adjacent the inner wall 451 of box 450, as illustrated by arrow B in FIG. 18. The fitting 412 can then be inserted through opening 565 in the box 450 such that the thread 426 on the wedge portion 428 of the fitting 412 engages the internal thread-receiving groove 504 of the adaptor 430. As the fitting is rotated (e.g., clockwise), the threaded engagement of the fitting 412 with the adaptor 430 moves the wedge portion 428 further within the adaptor 430, such that axially outer surface 464 of the collar portion 460 of the fitting 412 can snugly engage the outer wall 453 of the box 450. Further, the rotation of the fitting 412 and engaged adaptor 430 ultimately cause the ear member 555 to rotate such that outer edge 559 will contact the floor 51 of the box, as shown in FIG. 23. In this way, the adaptor and fitting are snugly engaged with the box, and a pipe or conduit element can then be inserted into the first end 422 of the fitting as described elsewhere herein. Any wiring or cabling within the conduit element can then be drawn through the fitting and adaptor for ready manipulation within the box 450.

It will be appreciated that the present invention provides various methods for assembling and operating piping joint assemblies, including, for example, providing a fitting as described elsewhere herein, wherein the fitting has an outer wall, and an inner wall, wherein the inner wall defines a locking compartment and a pipe receiving cavity extending along a longitudinal axis of the fitting; inserting a pusher locking member into the fitting so as to be maintained within the locking compartment; and securing a release pusher to the pusher locking member, the release pusher having a substantially cylindrical outer wall having an axially outer end, a substantially cylindrical inner wall having an axially outer end, and an axially outer wall connecting the axially outer end of the outer wall and the axially outer end of the inner wall, wherein the release pusher is secured to the locking member such that the inner wall is axially movable into the cavity, and rotatable about the fitting longitudinal axis. The present invention can further include tamper-resistant features to dissuade any unscrupulous individual from attempting to tamper with the device and/or internal components.

It will be appreciated that any and all dimensions described herein are exemplary and provided as embodiments associated with proper working operation of the present invention. Further, it will be appreciated that, in one embodiment of the present invention, the members of the push connect joint assembly can be formed through hydroforming processes.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A conduit device for ingress and egress to a utility box, comprising:
 a fitting having an interior wall and an exterior wall, wherein the interior wall defines a fitting cavity extending along an axis through the fitting, wherein the fitting comprises a wedge portion integrally formed with the fitting and having an external surface, wherein the external surface of the wedge portion comprises a thread, and wherein the fitting exterior wall comprises a collar portion integrally formed with the fitting and extending radially outwardly of the fitting exterior wall, wherein the fitting is formed so as to provide a sealing ring compartment with an interior surface, a fastening ring compartment with an interior surface and a pusher locking member compartment with an interior surface, wherein the radial distance from the axis to the pusher locking member compartment is greater than the radial distance from the axis to the fastening ring compartment, and further wherein the radial distance from the axis to the fastening ring compartment is greater than the radial distance from the axis to the sealing ring compartment; and
 an adaptor comprising a body portion with an interior wall and an outer circumferential wall, wherein the interior wall defines an opening extending through the adaptor along an adaptor axis, and wherein the fitting is removably engageable with the adaptor, wherein the adaptor further comprises at least one ear member integrally formed with the body portion so as to comprise a single unitary member, with the at least one ear member extending radially outwardly from the outer circumferential wall of the body portion of the adaptor;
 at least one sealing member positioned within the fitting cavity, wherein the at least one sealing member has a substantially ring-shaped body forming an opening extending axially therethrough; and
 a fastening ring positioned within the fitting cavity, wherein the fastening ring has a substantially ring-shaped body forming an opening extending axially therethrough.

2. The device of claim 1, further comprising:
 at least one sealing member positioned within the sealing ring compartment, wherein the at least one sealing member has a substantially ring-shaped body forming an opening extending axially therethrough; and
 a fastening ring positioned within the fastening ring compartment, wherein the fastening ring has a substantially ring-shaped body forming an opening extending axially therethrough.

3. The device of claim 2, further comprising:
 a sealing member stabilizer positioned within the fitting cavity between the at least one sealing member and the fastening ring;
 a pusher locking member positioned within the pusher locking member compartment and adjacent the fastening ring; and
 a release pusher positioned at least partly within the fitting cavity and in sliding engagement with the pusher locking member.

4. The device of claim 1, wherein the fastening ring comprises a radially outer surface from which at least one nub extends radially outwardly.

\* \* \* \* \*